US007795515B2

(12) United States Patent
Bartholomew

(10) Patent No.: US 7,795,515 B2
(45) Date of Patent: Sep. 14, 2010

(54) LAMINATED STRINGED INSTRUMENT BOW

(76) Inventor: John Bartholomew, 2101 Las Palmas Dr., Suite B, Carlsbad, CA (US) 92009

( * ) Notice: Subject to any disclaimer, the term of this patent is extended or adjusted under 35 U.S.C. 154(b) by 707 days.

(21) Appl. No.: 11/686,758

(22) Filed: Mar. 15, 2007

(65) Prior Publication Data

US 2009/0249937 A1 Oct. 8, 2009

(51) Int. Cl.
*G01D 1/02* (2006.01)

(52) U.S. Cl. ........................................ 84/282; 473/561

(58) Field of Classification Search .................. 84/282, 84/274, 283; 473/561

See application file for complete search history.

(56) References Cited

U.S. PATENT DOCUMENTS

| | | | | |
|---|---|---|---|---|
| 2,487,442 | A | 11/1949 | Hohl | |
| 3,440,918 | A | 4/1969 | Wurlitser | |
| 3,456,544 | A | 7/1969 | Glasser | |
| 4,015,501 | A | 4/1977 | Schaller | |
| 4,754,681 | A | 7/1988 | Maigret | |
| 4,860,629 | A | 8/1989 | Del Giudice | |
| 5,409,651 | A | 4/1995 | Head | |
| 5,463,970 | A | 11/1995 | Hartlmeier | |
| 5,575,875 | A | 11/1996 | Brittingham | |
| 6,036,610 | A | 3/2000 | Lewark | |
| 6,075,188 | A | 6/2000 | Wetzlinger | |
| 6,148,865 | A | 11/2000 | Head | |
| 7,262,353 | B2 * | 8/2007 | Bartholomew et al. | 84/282 |

FOREIGN PATENT DOCUMENTS

| | | | |
|---|---|---|---|
| DE | 4014894 | A1 | 11/1990 |
| EP | 933756 | A2 | 8/1999 |
| JP | 2001117558 | A | 4/2001 |

* cited by examiner

*Primary Examiner*—Jianchun Qin
(74) *Attorney, Agent, or Firm*—J. Curtis Edmondson

(57) ABSTRACT

A new and improved instrument bow for use with a stringed instrument is provided. A unique new instrument bow is provided that may be constructed with a laminate material and/or composite in combination with a wooded material to form the instrument bow. Additionally, the new instrument bow uses a laminate composite such as carbon fiber to form a single piece construction instrument bow for use in conjunction with a stringed instrument. The instrument bow may be a combination of a synthetic material covered with a wooded material in a single piece construction that will provide the instrument bow with increased resilience and strength without the necessity for reinforcement and/or repair.

6 Claims, 4 Drawing Sheets

LAMINATED STRINGED INSTRUMENT BOW

FIELD OF THE INVENTION

This invention relates to the field of stringed instruments. More specifically, this invention relates to a bow that is used in conjunction with a stringed instrument. Further, this invention relates to an instrument bow that is comprised of a laminated composition that may be flexible yet durable for use with a stringed instrument and further constructed as part of a single piece operation.

BACKGROUND OF THE INVENTION

Historically, the bow has been a very important part of most stringed instruments, and most stringed instruments would be practically useless without the use of one. Therefore, it is important to understand the origin of the bow and its construction to fully appreciate the sounds that emanate from a stringed instrument.

SUGGESTIONS

As an "ancillary" component of musical instruments, the bow was well known in ancient cultures and was used very early on in instrument development. The bow was used early on dating back to the Byzantine Empire and to the regions of the Arab world. However, the bow was not introduced into Western culture until much later in the development of musical instruments.

Early stringed instruments and the bow utilized to play these instruments were very crude, elementary and largely undeveloped. Additionally, there was very little consistency in the materials and construction of both the instrument and the related bows utilized to play the instrument. For example, early bows had various curvatures relating to the stick of the bow, many being convex and many being concave. Additionally, the hairs used in early bows were coarsely attached to the stick. Moreover, there was insufficient ability to fasten the hairs and/or adjust the tension of the hair to the stick. Often times, the stick had to be frequently repaired or entirely replaced.

The evolution of the bow was stagnant for a considerable period of time. Because of its limited use, and the technical knowledge of the time, very little developments were made to the bow and/or to stringed instruments. And the developments that were made, such as devices to spread the hairs of the bow were overly contemplated. However, it wasn't until much later in the development of stringed instruments, and particularly the violin, that improvements to the bows, and related frog portion of the bow became necessary. The improvement of the violin and related instruments necessitated the need for improvement and development of denotated mechanisms to adjust hair tension, and the need for true button and screw mechanisms.

The bow heads that we know today, commonly referred to as "pike-type" bow appeared around the time of the death of instrument producer, Stradivari. The woods used in the construction of bows included ironwood and snakewood. Often, the makers of bows tried to utilize lighter woods which were often fluted to give the bow additional strength and rigidity.

However, the curvature, or camber of the bow remained substantially convex for an extended period of time during the evolution of the bow. Perhaps as a result of experimentation and artistic collaboration, the camber was changed from convex to concave, the fluted bow and pike's head abandoned, and the ferrule invented.

After this development, the bow changed considerably as a result of changes in performance venues. As music moved from the smaller stages to larger venues and larger audiences, the need for a different type of bow emerged. These newer bows enabled greater sonority, power, and projection while sustaining a wider range of dynamic levels, and articulated a greater variety of new bowing techniques.

The use of Pernambuco wood became the wood of choice for string instrument bows because pernambuco wood is extremely heavy and dense. Pernambuco was also an important source in dye manufacturing before the advent of synthetic aniline dyes. The ready availability of tremendous quantities of pernambuco wood eventually changed the construction of the bow because of pernambuco's combination of strength and elasticity for making bows.

Modern producers of bows have attempted to make the bow out of a composite material including fiberglass and plastics. However, the sound qualities and the construction necessary to make these bows have been problematic and have led most users to stick with the wood designs.

A problem with the standard type instrument bows is that they are made up of a plurality of pieces that must be fitted together to form the unit. Because the instrument bow is constructed in a plurality of pieces that are subsequently affixed to each other, they tend to come apart after substantial use and must be either fixed or discarded.

Yet another problem exists because the typical instrument bow must be constantly adjusted and requires a considerable amount of upkeep to keep the bow in condition for use.

What is needed is an improved instrument bow and technique for making the improved instrument bow. Further, a need therefore exists for an improved instrument bow that may use more modern materials that may be cheaper and easier to form. Moreover, a need exists for an instrument bow that is a single piece construction that does not need frequent repair and/or adjustment yet has good sound quality and utility.

SUMMARY OF THE INVENTION

The present invention provides a new instrument bow for use with a stringed instrument. More specifically, the present invention provides a new instrument bow that may be constructed with an insert laminate to form the instrument bow. Additionally, the present invention provides a new instrument bow using modern composite materials to form a single piece construction instrument bow for use in conjunction with a stringed instrument. The present invention also provides an instrument bow that is resilient and does not need constant reinforcement and/or repair.

To this end, in an embodiment of the present invention an instrument bow is provided. The bow has a frog portion with said frog portion positioned at one end of the instrument bow and a shaft portion. Additionally, the bow has a head portion positioned at a second end of the instrument bow wherein said head portion is connected to said shaft portion which in turn is connected to said frog portion whereby the frog portion, head portion and shaft portion are constructed in unitary fashion. Moreover, the bow has a hair means attached to the frog portion and the head section and extending therebetween, and wherein the shaft portion and said head portion are constructed into a single piece construction covered by an uninterrupted wooded material.

In an exemplary embodiment, the bow further comprises the frog portion, said shaft portion and said head portion being connected to each other in a seamless fashion.

In an exemplary embodiment, the bow further has a horsehair portion detachably connected to said head portion and extending away from said head portion and detachably connected to said frog portion.

In an exemplary embodiment, the shaft portion and said head portion are covered by a wooded material wherein said wooded material is wrapped about the entirety of the bow whereby the wooded material covers an inner laminate layer.

In an exemplary embodiment, the bow's frog portion, shaft portion and head portion are comprised of a solid core of laminate material and wrapped with unidirectional carbon fibers running along its longitudinal axis.

In an exemplary embodiment, the shaft portion and said head portion are comprised of a solid core of laminate material whereby the laminate material is enveloped by a wooded material that completely envelops the laminate material.

In an exemplary embodiment, the bow further has a solid core wherein the laminate material is carbon, fiberglass, carbon fiber, aramid, Kevlar®, Vectran® or Spectra®.

In an exemplary embodiment, the bow further has a shaft portion and a head portion that are formed as a single unit covered with a wooded material and further wherein the single unit covered with a wooded material while incorporating the laminate material is infused with resin.

To this end, in an exemplary embodiment of the present invention, an instrument bow is provided. The bow has a frog portion with said frog portion being positioned at one end of the instrument bow, a shaft portion and a head portion positioned at a second end of the instrument bow wherein said head portion is connected to said shaft portion which in turn is connected to said frog portion by way of hair means. Additionally, the shaft portion and said head portion form a single piece unit. Moreover, the bow has a wooded material encompassing said single piece unit wherein said wooded material covers the entirety of the bow in a single piece fashion.

In an exemplary embodiment, the bow further has a laminate material incorporated into an interior portion of the bow.

In an exemplary embodiment, the bow further has a horsehair portion detachably connected to said head portion and extending away from said head portion and detachably connected to said frog portion.

In an exemplary embodiment, a bow is provided wherein said shaft portion and said head portion are comprised of a solid core of laminate material covered by a wooded material.

In an exemplary embodiment, the bow further has a laminate material incorporated into the interior portion of the bow whereby the laminate material is carbon fiber and further wherein the laminate material is enclosed by the wooded material of the bow.

To this end, in an exemplary embodiment of the present invention, a method of fabricating an instrument bow is provided. The method comprising the steps of: providing a solid core of a synthetic material wherein said solid core includes a head portion, a shaft portion and a frog portion; injecting said synthetic material into a mold to produce a single piece instrument bow piece; inserting said core through a device that wraps the core with a wooded material and producing a preform of said core covered by said wooded material.

In an exemplary embodiment, the method further comprises the step of: inserting the core through a device that wraps the core with a wooded material wherein said wooded material envelops the entirety of the bow.

In an exemplary embodiment, the method further comprises the step of: placing the preform into a mold and closing the mold about the preform.

In an exemplary embodiment, the method further comprises the step of: utilizing a resin transferee molding to infuse resin into the mold when the mold is closed.

In an exemplary embodiment, the method further comprises the step of: heating the mold to facilitate curing of the resin to the preform; and removing the mold from the oven, cooling the mold and removing the instrument bow from the mold.

It is, therefore, an advantage of the present invention to provide a unique instrument bow and a method of making the same.

Another exemplary embodiment of the present invention is to provide a new instrument bow and a method of making the same that may be used with a variety of different musical instruments.

Still another exemplary embodiment of the present invention is to provide a new instrument bow and a method of making the same that may be used in conjunction with a stringed instrument.

Yet another exemplary embodiment of the present invention is to provide a new instrument bow and a method of making the same that may be used to play a violin.

Another exemplary embodiment of the present invention is to provide a new instrument bow and a method of making the same wherein the instrument bow may be made of plastic.

Still another exemplary embodiment of the present invention is to provide a new instrument bow and a method of making the same wherein the instrument bow may be made of wood.

An exemplary embodiment of the present invention is to provide a new instrument bow and a method of making the same wherein the instrument bow may be made of a substantially rigid material.

Yet another exemplary embodiment of the present invention is to provide a new instrument bow and a method of making the same wherein the instrument bow may be made of a flexible material.

Still another exemplary embodiment of the present invention is to provide a new instrument bow and a method of making the same wherein the instrument bow may be made quickly from a mold.

Another exemplary embodiment of the present invention is to provide a new instrument bow and a method of making the same wherein the instrument bow may be fabricated in a mold and wherein the mold may allow the core to be hollow.

Yet another exemplary embodiment of the present invention is to provide a new instrument bow and a method of making the same wherein the instrument bow may be fabricated in a mold and wherein the mold may allow the core to be hollow and further wherein the core may be infused with resin and/or laminate.

An exemplary embodiment of the present invention is to provide a new instrument bow and a method of making the same wherein the instrument bow may be fabricated using a resin infusion process.

Still another exemplary embodiment of the present invention is to provide a new instrument bow and a method of making the same wherein the instrument bow may use a lamination insertion therein.

Yet another exemplary embodiment of the present invention is to provide a new instrument bow and a method of making the same wherein the instrument bow may use a laminate material therein, wherein said laminate material may be surrounded by traditional wooden materials.

Still another exemplary embodiment of the present invention is to provide a new instrument bow and a method of making the same wherein the instrument bow may have a core made of a composite material that may be surrounded by wood.

Another exemplary embodiment of the present invention is to provide a new instrument bow and a method of making the same wherein the instrument bow may have a laminate material contained therein wherein the wood surrounds the core laminate material in a seamless fashion.

A further exemplary embodiment of the present invention is to provide a new instrument bow and a method of making the same wherein the instrument bow may use laminate material in combination with wood to form the bow.

Yet another exemplary embodiment of the present invention is to provide a new instrument bow and a method of making the same wherein the instrument bow may use laminate material in combination with a wood to form a single piece bow.

Still another exemplary embodiment of the present invention is to provide a new instrument bow and a method of making the same wherein the instrument bow may use laminate material in combination with a composite material to form a bow.

An exemplary embodiment of the present invention is to provide a new instrument bow and a method of making the same wherein the instrument bow may use laminate material in combination with wood to form a bow wherein the laminate material may form the outside portion and the wood may form the interior portion of the bow.

Yet another exemplary embodiment of the present invention is to provide a new instrument bow and a method of making the same wherein the instrument bow may use a laminate material in combination with brass wire and wood to form a bow.

Another exemplary embodiment of the present invention is to provide a new instrument bow and a method of making the same wherein the instrument bow may use a laminate material in combination with gold wire and wood to form a bow.

Still another exemplary embodiment of the present invention is to provide a new instrument bow and a method of making the same wherein the instrument bow may use a laminate material in combination with Vectran®, Spectra®, Kevlar®, wood and/or any polyester to form a bow.

An exemplary embodiment of the present invention is to provide a new instrument bow and a method of making the same wherein the construction of the instrument bow may be by resin infusion and subsequent setting of wood about the infusion.

Yet another exemplary embodiment of the present invention is to provide a new instrument bow and a method of making the same wherein the construction of the instrument bow may be by resin infusion wherein the resin infusion process may allow for placement of an un-impregnated part into a mold formed in the shape of the instrument bow.

Still another exemplary embodiment of the present invention is to provide a new instrument bow and a method of making the same wherein the construction of the instrument bow may be by resin infusion wherein the resin infusion process may allow for placement of an un-impregnated part into a mold formed in the shape of the instrument bow and further wherein the process may allow infusion of resin, curing the bow and removing the finished product from the mold.

Another exemplary embodiment of the present invention is to provide a new instrument bow and a method of making the same wherein the instrument bow may be made of hand impregnated resin.

A further exemplary embodiment of the present invention is to provide a new instrument bow and a method of making the same wherein the instrument bow may be made of a machine impregnated thermosetting resin.

Still another exemplary embodiment of the present invention is to provide a new instrument bow and a method of making the same wherein the instrument bow may be composed of an impregnated material that is rolled and cured to shape.

Yet another exemplary embodiment of the present invention is to provide a new instrument bow and a method of making the same wherein the instrument bow may be composed of an impregnated material that may be laid into molds and cured to shape.

Still another exemplary embodiment of the present invention is to provide a new instrument bow and a method of making the same wherein the instrument bow may be composed of a plurality of materials to form the bow.

Yet another exemplary embodiment of the present invention is to provide a new instrument bow and a method of making the same wherein the instrument bow may be flexible during use.

An exemplary embodiment of the present invention is to provide a new instrument bow and a method of making the same wherein the instrument bow may be rigid.

Another exemplary embodiment of the present invention is to provide a new instrument bow and a method of making the same wherein the instrument bow may be a single piece construction.

A further exemplary embodiment of the present invention is to provide a new instrument bow and a method of making the same wherein the instrument bow may be a single piece construction wherein the head of the bow, frog and the shaft of the bow are formed together and are not detachably released from each other.

Yet another exemplary embodiment of the present invention is to provide a new instrument bow and a method of making the same wherein the instrument bow may be a single piece construction wherein the entire laminate composition is covered with wood.

Still another exemplary embodiment of the present invention is to provide a new instrument bow and a method of making the same wherein the instrument bow may be a single piece construction wherein the entire bow may be covered with a composition of woody material about a carbon fiber insert.

Still another exemplary embodiment of the present invention is to provide a new instrument bow and a method of making the same wherein the instrument bow may be made of a plurality of pieces which are formed together and may be detachably released from each other allowing for the parts of the bow including the head, the frog and the shaft to be replaced with other bow pieces.

An exemplary embodiment of the present invention is to provide a new instrument bow and a method of making the same wherein the instrument bow may be constructed with a plurality of pieces that are attached and covered with a woody material.

Yet another exemplary embodiment of the present invention is to provide a new instrument bow and a method of making the same wherein the instrument bow may be formed as a single piece unit in a mold.

Still another exemplary embodiment of the present invention is a new instrument bow and a method of making the same wherein the instrument bow provides good quality sound.

Another exemplary embodiment of the present invention is a new instrument bow and a method of making the same wherein the instrument bow may last longer than conventional prior art instrument bows.

Another exemplary embodiment of the present invention is to provide a new instrument bow and a method of making the same wherein the instrument bow may retain conventional prior art design for an instrument bow.

Still another exemplary embodiment of the present invention is to provide a new instrument bow and a method of making the same wherein the instrument bow may have a carbon fiber material therein yet still have the outer look and feel of wood whereby the improved instrument bow may increase the strength and durability of the instrument bow as opposed to prior art instrument bows.

These and other objects of the invention will become more clear when one reads the following specification, taken together with the drawings that are attached hereto.

The scope of protection sought by the inventors may be gleaned from a fair reading of the Claims that conclude this specification.

Additional features and exemplary embodiments of the present invention are described in, and will be apparent from, the detailed description of the presently preferred embodiments and from the drawings.

DESCRIPTION OF THE PREFERRED EMBODIMENT

Figure 1:
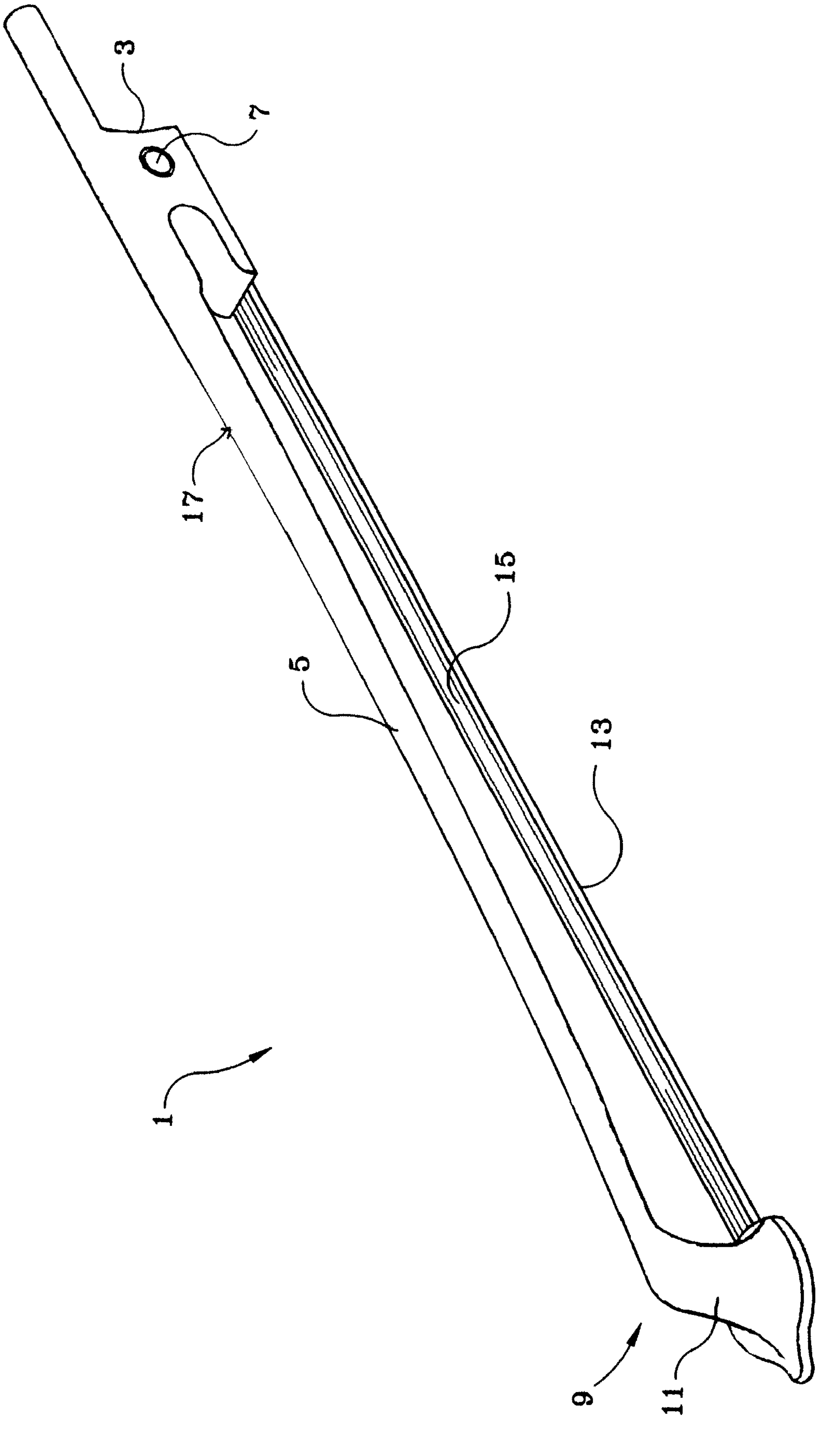
FIG. 1 is a perspective view of the instrument bow in an embodiment of the present invention.

Turning now to the drawings wherein elements are identified by numbers and like elements are identified by like numbers throughout the 5 figures, the invention is depicted in FIG. 1 that shows an instrument bow 1.

The instrument bow 1 may have a plurality of corresponding connecting parts that form the whole of the bow 1. The bow 1 may have a frog 3. The frog 3 may be the back of the bow 1 where a user (not shown) may hold the bow 1 to use in association with a musical instrument (not shown). The frog 3 may be connected to the shaft 5 of the instrument bow 1. The frog 3 of the bow 1 may have an eye 7. The eye 7 of the bow 1 may be contained anywhere on the frog 3. In a preferred embodiment of the present invention, the eye 7 may be positioned in the middle of the frog 3 of the instrument bow 1. In an embodiment, the eye 7 may be silver. In another embodiment, the eye 7 may be nickel. However, as can be appreciated, the eye 7 may be of any suitable material for functional or aesthetic purposes. FIG. 1 also illustrates the shaft 5 of the instrument bow 1. The shaft 5 may have a curvature from the back and/or frog 3 of the bow 1 to the front 9 of the bow 1. The front 9 of the bow 1 may be configured to have a head 11. The head 11 of the instrument bow 1 is connected to the shaft 5 of the bow 1 which in turn is connected to the frog 3 of the instrument bow 1.

As further illustrated in FIG. 1, the head 11 of the bow 1 may be connected to the frog 3 of the instrument bow 1 by a hair means 13. The hair means 13 may be connected to the head 11 and pulled toward the frog 3 and ultimately connected to the frog 3 of the instrument bow 1. In an embodiment, a plurality of horse hair 15 may be used to construct the entirety of the hair means 13. However, the hair means 13 may be any material that may be connected to the frog 3 and the head 11 simultaneously and yet able to produce the desired effect of playing a stringed instrument (not shown).

Moreover, FIG. 1 illustrates an instrument bow 1 that may be outwardly comprised of a wooded material. The wooded material may be a solid wood cut for the particular purpose of composition of the bow, or may be a woody composition such as plywood or other woody material. In an exemplary embodiment, the wood may be engineered wood comprising of thin sheets of veneer or other material that may provide excellent strength, stiffness and consistency for a longer period than prior art instrument bows. The instrument bow 1 may utilize a laminate material 17 that may be placed into a molded composite bow 1 and may be infused with resin to form the laminate material into the instrument bow 1. In a preferred embodiment, the laminate material 17 may be carbon fiber or any other laminate material whereby the laminate material may be used within the entire structure of the instrument bow 1, wherein the laminate material 17 may be encapsulated by the woody material on the outside portion of the bow 1, forming a single piece bow 1. The advantage of a single piece and/or unit instrument bow 1 may be that the single piece and/or unit instrument bow 1 may not have the characteristics of prior art bows wherein the prior art bows need frequent repairs and/or alterations to keep them in good repair. A single piece unit may be more resilient, stiffer, and/or stronger than the prior art instrument bows.

Figure 2:
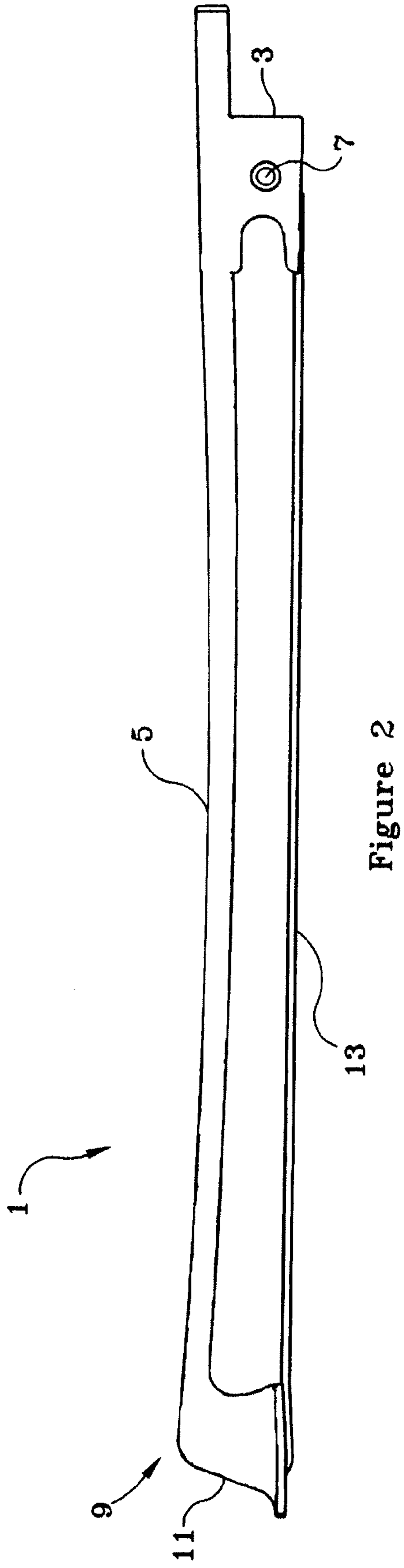
FIG. 2 is a side view of the of the instrument bow in an embodiment of the present invention.
Figure 3:
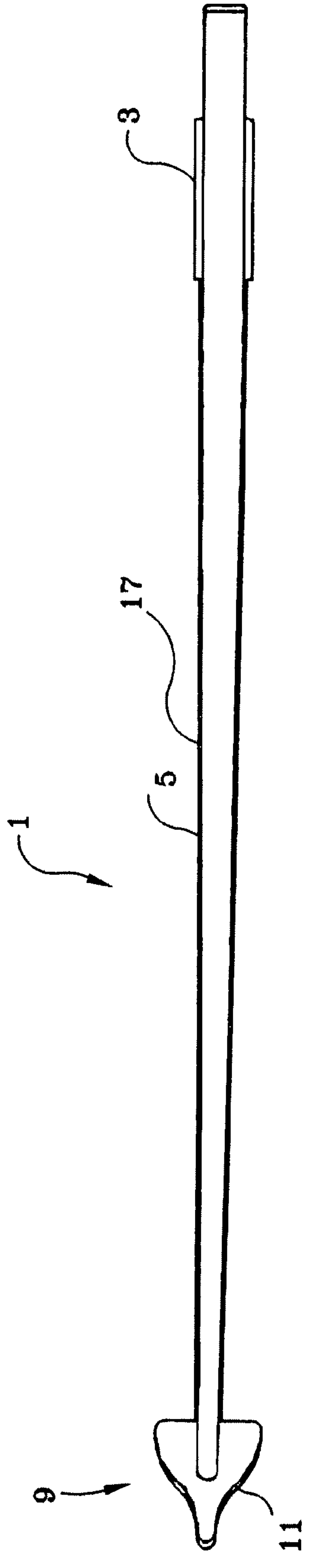
FIG. 3 is a top view of the instrument bow in an embodiment of the present invention.

FIG. 2 illustrates a side view of the instrument bow 1 showing the single piece construction of the instrument bow 1. Moreover, FIG. 2 illustrates the wooded material covering a composite and/or laminate material 17 (see FIG. 4) that may be used to construct the instrument bow 1. Any composition and/or laminate material 17 may be used to construct the instrument bow 1. In a preferred embodiment, the composite material 17 may be carbon fiber and/or fiberglass. However, the composite material 17 used to form the inner portion 18 of the instrument bow 1 may use a plurality of materials including, but not limited to: titanium wire, brass wire, gold wire, Vectran.RTM., Spectra.RTM., Kevlar.RTM., polyester, or a plurality of other materials suitable for constructing an instrument bow 1. Furthermore is well known to those in the arts that these material include: ultra high molecular weight polyethylenes, paramid synthetic fibers, or fiber spun liquid crystal polymers.

Figure 4:
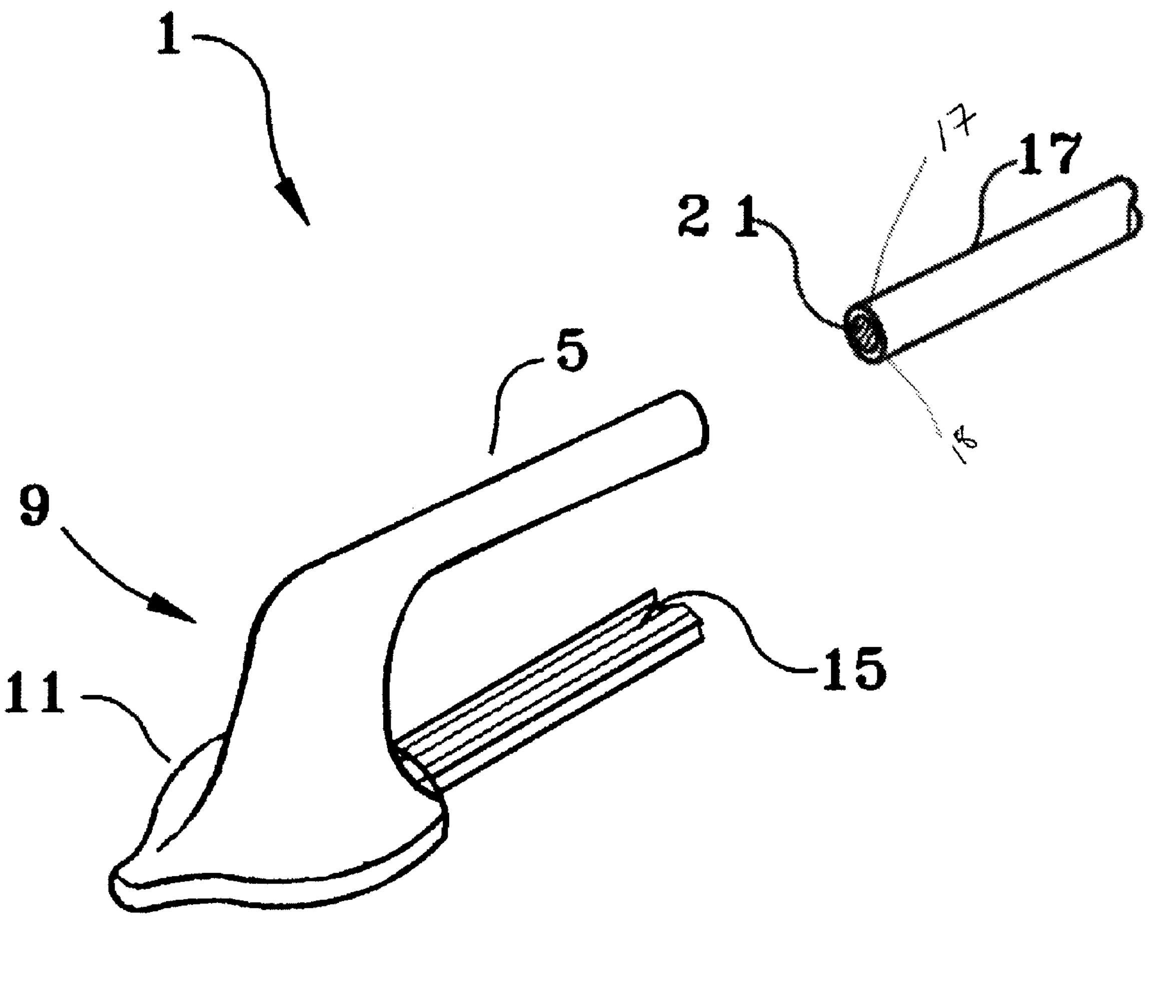
FIG. 4 is a cross sectional perspective view of the instrument bow in an embodiment of the present invention.

As illustrated in FIG. 2 and FIG. 4, the composite and/or laminate material 17 may be used as the core composition of the bow. However, it should be understood that the laminate material 17 may be utilized to cover the wooded material. The laminate material 17 and/or other material may be first fabricated either by hand, or by the formation of a mold. The fabricated composite material 17 may then be covered by a wooded material such as wood and that may subsequently be placed into a mold and infused with a substance to hold the composite in place and whereby the wooded material would be infused over the laminate material 17 to form the single piece bow. The laminate material 17 and the wooded material in combination may then form a single piece instrument bow 1 for use with a variety of preferably stringed instruments, including the violin, the cello, and other stringed instruments.

FIG. 4 also illustrates a cross-section view of the instrument bow 1. The laminate material 17 may be fabricated and covered with the wooded material thereby giving the impression that the entire apparatus is constructed of wood. Additionally, the use of wooded material only on the outside portion of the bow may allow for the use of cheaper and/or less expensive woods yet still retaining the desired flexibility and stiffness of the composite bow. In an exemplary embodiment, the laminate material 17 is placed into a resin mold wherein the subsequent wooded material is added to the laminate material during or after the laminate material has hardened and further wherein the wooded material is set above the one piece laminate material 17. The complete bow 1 including the laminate material 17 and the wooded material may be infused with resin to strengthen the composition and provide better resiliency, stiffness and consistency than standard type instrument bows for a longer period of time.

Figure 5:
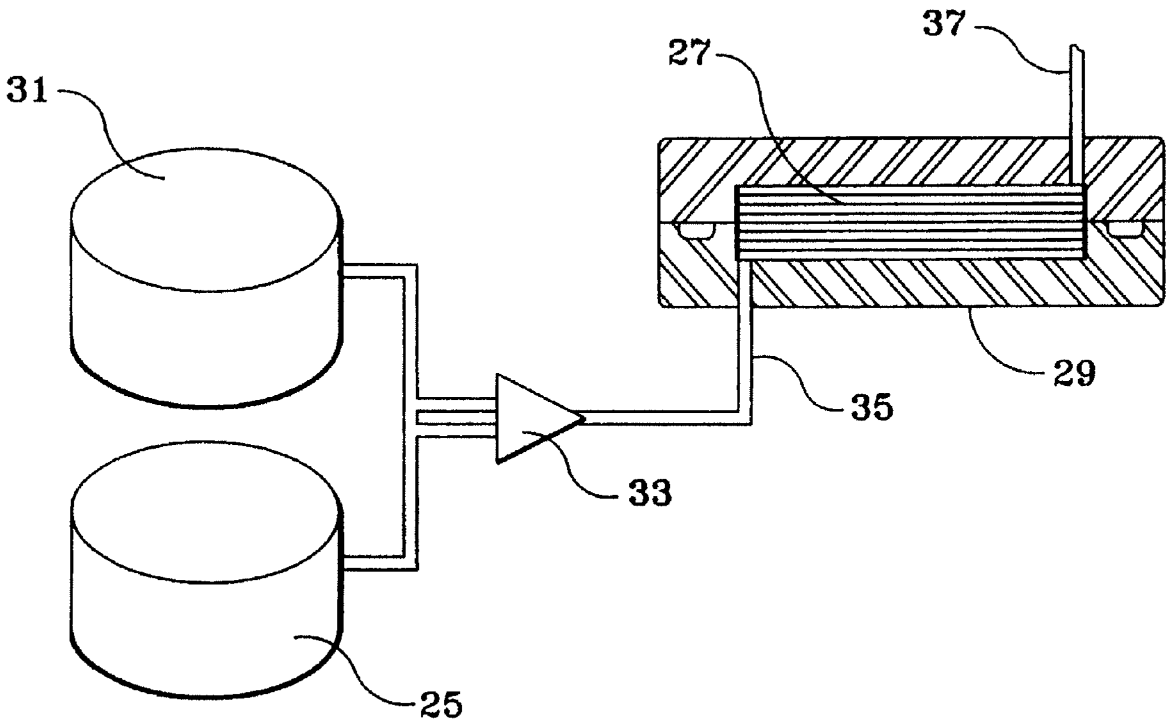
FIG. 5 is a schematic of the process to make the instrument bow in an embodiment of the present invention.

FIG. 5 illustrates the process of manufacturing the braided composite bow 1. In a preferred embodiment, a solid core of a polyurethane foam may be wrapped with unidirectional carbon fibers running along its longitudinal axis. The core with attached fibers may then be run through a braider that may wrap a plurality of fibers helically. The preform may then be placed into a mold 29 and the mold 29 is subsequently closed about the preformed instrument bow 1. The process of resin transferee molding the cavity may be used to infuse the preform with uncured resin 25 which may include epoxy, vinyl ester, polyester or any other uncured resin 25. The resin may be mixed with a hardener 31 and sent through a mixing head 33. The resin 25 and the hardener 31 may be sent through the mixing head 33 and discharged into the mold/cavity 29 that may hold the braided instrument bow 1. The resin 25 and the hardener 31 may be inserted into the mold/cavity 29 by the use of an inlet head 35, and the excess resin and hardener may be disposed of with an outlet and/or vent 37. In a preferred embodiment, the instrument bow 1 may be placed in a heating means 27 to cure the resin 25 to the instrument bow 1 composite. After heating, the part may be removed from the heating means 25, cooled and taken out of the mold/cavity 27. While the above identified process is the preferred embodiment of fabricating the composite bow, it should be understood that many minor modifications may be undertaken to complete the same process by a slightly different means, without departing from the essential process of infusion of resin 25 and hardener 31 over a braided preform of an instrument bow 1.

It should be understood, however, that modifications to the presently preferred embodiments described herein will be apparent to those skilled in the art. Such changes and modifications may be made without departing from the spirit and scope of the present invention and without diminishing its attendant advantages.

What is claimed is:

1. An instrument bow comprising a frog portion, said frog portion being positioned at one end of the instrument bow;

a shaft portion:

a head portion positioned at a second end of the instrument bow wherein said head portion is connected to said shaft portion which in turn is connected to said frog portion whereby the frog portion, head portion and shaft portion are constructed in unitary fashion;

a hair means attached to the frog portion and the head portion and extending therebetween;

said shaft portion and said head portion constructed into a single piece construction covered by an uninterrupted wooded material, wherein said shaft portion and said head portion are covered by a wooded material wherein said wooded material is wrapped about the entirety of the bow whereby the wooded material covers an inner laminate layer, wherein said wooded material is infused with resin over the laminate layer to form the single piece bow.

2. An instrument bow comprising a frog portion, said frog portion being positioned at one end of the instrument bow;

a shaft portion;

a head portion positioned at a second end of the instrument bow wherein said head portion is connected to said shaft portion which in turn is connected to said frog portion whereby the frog portion, head portion and shaft portion are constructed in unitary fashion;

a hair means attached to the frog portion and the head portion and extending therebetween; said shaft portion and said head portion constructed into a single piece construction covered by an uninterrupted wooded material, wherein said frog portion, said shaft portion and said head portion further comprise a solid core of laminate material and being wrapped with unidirectional carbon fibers running along its longitudinal axis, wherein said wooded material is infused with resin over the carbon fibers to form the single piece bow.

3. An instrument bow comprising a frog portion said frog portion being positioned at one end of the instrument bow;

a shaft portion;

a head portion positioned at a second end of the instrument bow wherein said head portion is connected to said shaft portion which in turn is connected to said frog portion whereby the frog portion, head portion and shaft portion are constructed in unitary fashion; a hair means attached to the frog portion and the head portion and extending therebetween;

said shaft portion and said head portion constructed into a single piece construction covered by an uninterrupted wooded material, wherein said shaft portion and said head portion further comprising of a solid core of laminate material whereby the laminate material is enveloped by a wooded material completely envelops the laminate material, wherein said wooded material is infused with resin over the laminate material to form the single piece bow.

4. The instrument bow of claim 3 wherein said solid core of the laminate material is carbon, fiberglass, carbon fiber, aramid, an ultra high molecular weight polyethylene, para-aramid synthetic fibers, or fiber spun liquid crystal polymers.

5. An instrument bow comprising a frog portion said frog portion being positioned at one end of the instrument bow;

a shaft portion;

a head portion positioned at a second end of the instrument bow wherein said head portion is connected to said shaft portion which in turn is connected to said frog portion by way of hair means; said shaft portion and said head portion forming a single piece unit; a wooded material encompassing said single piece unit wherein said wooded material covers the entirety of the bow in a single piece fashion, and wherein said shaft portion and said head portion are comprised of a solid core of laminate material covered by said wooded material, wherein said wooded material is infused with resin over the laminate material to form the single piece bow.

6. An instrument bow comprising a frog portion said frog portion being positioned at one end of the instrument bow;

a shaft portion;

a head portion positioned at a second end of the instrument bow wherein said head portion is connected to said shaft portion which in turn is connected to said frog portion by way of hair means; said shaft portion and said head portion forming a single piece unit; a wooded material encompassing said single piece unit wherein said wooded material covers the entirety of the bow in a single piece fashion, and a laminate material incorporated into the interior portion of the bow whereby the laminate material is carbon fiber and further wherein the laminate material is enclosed by said wooded material, wherein said wooded material is infused with resin over the laminate layer to form the single piece bow.

* * * * *